Figure 1:
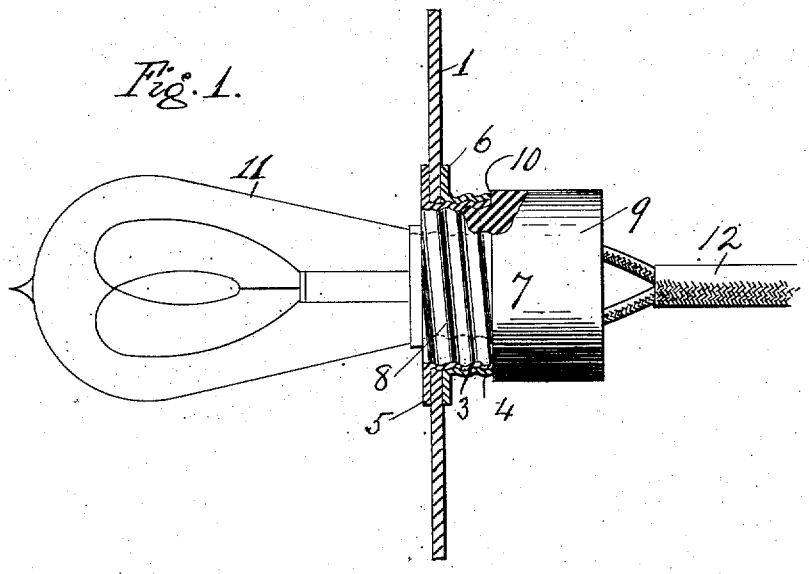

F. W. RUBY.

ELECTRIC LAMP RECEPTACLE FOR ELECTRIC SIGNS.

APPLICATION FILED NOV. 15, 1909.

Reissued Mar. 15, 1910. 13,095.

WITNESSES

L. H. Grote

M. E. Keir

INVENTOR

Frederick W. Ruby

BY

Howson and Howson

ATTORNEYS.

UNITED STATES PATENT OFFICE.

FREDERICK W. RUBY, OF JACKSON, MICHIGAN, ASSIGNOR TO RUBY MANUFACTURING COMPANY, OF JACKSON, MICHIGAN, A CORPORATION OF MICHIGAN.

ELECTRIC-LAMP RECEPTACLE FOR ELECTRIC SIGNS.

13,095. Specification of Reissued Letters Patent. Reissued Mar. 15, 1910.

Original No. 904,728, dated November 24, 1908, Serial No. 422,285. Application for reissue filed November 15, 1909. Serial No. 528,267.

*To all whom it may concern:*

Be it known that I, FREDERICK W. RUBY, a citizen of the United States, residing at Jackson, in the county of Jackson and State of Michigan, have invented a new and useful Electric-Lamp Receptacle for Electric Signs, of which the following is a specification.

This invention has reference to improvements in electric lamp receptacles for electric signs, and is designed to produce a receptacle which may be readily applied to the metallic face of the sign so that the lamp sockets are substantially flush with the outer or exposed face of the sign.

It is customary to provide metal letters or signs with lamp sockets in which there is provided a porcelain collar on the face or outer side of the sign, and besides being unsightly the comparatively fragile porcelain often becomes broken by the strains incident to the contraction and expansion of the metal to which it is clamped under the action of changes of temperature.

By the present invention a porcelain socket is retained but the effects of expansion and contraction of the metal body of the sign upon such porcelain socket is prevented by providing a receptacle for the socket made up of two nesting screw sleeves provided with coacting flanges arranged to grip opposite faces of the body of the sign when one of the sleeves has been passed through a suitable orifice in the sign body and the other sleeve has been screwed upon the first sleeve until both flanges are brought into firm contact with the body of the sign. The sleeves are so proportioned that when such clamping action has been effected a suitably shaped porcelain lamp socket may be screwed into the interior of the inner sleeve and abut against the inner edges of the two nested sleeves.

By making the screw sleeves of comparatively soft metal the expansion and contraction will have no serious effect upon the comparatively frangible porcelain socket. The structure of the porcelain socket may be such as is usually employed in connection with incandescent electric lamp bulbs except that the exterior of the socket is formed with screw threads adapted to enter the inner one of the two sleeves, and the socket is also provided with a shoulder arranged to seat against those ends of the sleeves remote from the flanges.

The invention will be best understood by a consideration of the following detail description taken in connection with the accompanying drawings forming a part of this specification, in which drawings,—

Figure 2:
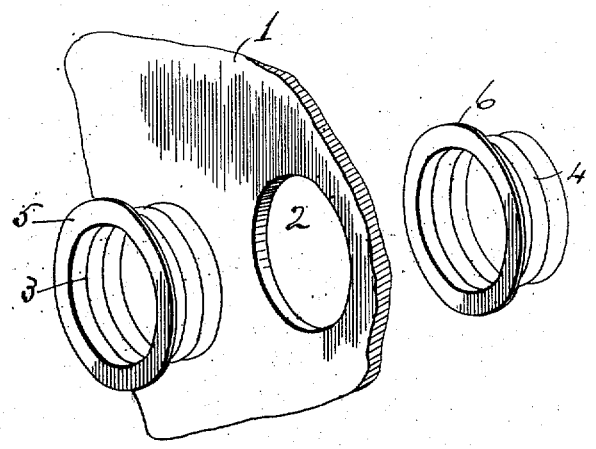

Figure 1 is a central section through a portion of the metal body of an electric sign or letter with the sleeves and socket in place and an incandescent electric lamp shown inserted in the socket. Fig. 2 is a perspective view showing a small portion of the body of the electric sign with the sleeves in position to be inserted but in separated relation.

Referring to the drawings, there is shown the body 1 of an electric sign or letter such as is commonly used in electric sign practice. It is to be understood that this body may be of suitable shape and use for the purposes intended. At appropriate points on the body portion 1 are formed orifices 2 for the introduction of the holding devices for the lamp sockets. These devices consist of two sleeves 3 and 4. The sleeve 3 is formed with screw threads and one end is bent into a radial flange 5. The sleeve 4 is likewise provided with screw threads and at one end is bent into a radial flange 6. The sleeve 3 is of a size to fit easily but snugly into the orifice 2 and may be readily passed through the same until further movement is resisted by the engagement of the flange 5 with the face of the sign body 1. The sleeve 4 is of such size and suitably threaded to be screwed upon the sleeve 3 until its flange 6 is in engagement with the rear face of the body 1 of the sign, the flange 6 engaging the body of the sign immediately adjacent to the orifice 2. The two sleeves, when in proper relation to the body 1 with the sleeve 4 screwed upon the sleeve 3, are in firm clamped relation to the body with the front face of the body of the sign free from projections except for the thickness of the flange 5, which of course may be quite inconsiderable. When the sleeve 4 is properly applied to the sleeve 5 so that the two sleeves are in clamped relation to the sign, then those edges of the two sleeves remote from the flanges 5 and 6 are the same distance from the rear face of the body 1.

The lamp socket, which, under the common practice is made of porcelain, is indicated at 7 and comprises a threaded neck portion 8 and a cylindrical or other shaped body portion 9 of slightly greater diameter than the neck portion so as to form a shoulder 10, which, when the neck portion 8 is screwed into the sleeve 3, will abut against the rear edges of the two sleeves 3 and 4. Under these circumstances the front edge of the neck 8 is substantially flush with the front face of the sign body. The interior construction of the lamp socket is immaterial to the present invention and is therefore not shown. It may be constructed in accordance with any of the usual designs for the purpose. The socket is properly constructed to receive an incandescent lamp bulb 11 of any approved type and the current may be carried to the lamp through the socket 7 by the usual conducting cord 12.

It is customary to make the sign or letter bodies 1 of such metal as plain iron or galvanized iron, and in such case the sleeves 3 and 4 will be made of a softer metal, such as copper, brass or zinc, although by no means confined to these particular metals.

Considering the sign provided with a number of orifices 2 through a comparatively heavy iron body 1 and each orifice being provided with a pair of sleeves 3 and 4 of metal, preferably a metal softer than iron, then it will be seen that the face of the sign is practically free from protuberances, and especially are there no porcelain parts on the front face of the sign liable to be injured by the effects of temperature changes upon the iron body. Of course in the structure shown expansion and contraction of the iron body take place under the variations in temperature, but there is always elasticity enough in the sleeves 3 and 4 to relieve the porcelain socket from undue pressure or strains due to the expansion and contraction of the iron body of the sign under the effects of temperature changes. Furthermore, the present invention avoids the use of bolts, or screws or other like means for the attachment of sockets to the iron body.

It is not necessary that the body 1 should be the body of a sign or letter, but the invention is adapted for use where ever it is desired to attach electric lamp receptacles or sockets under the conditions present in metal body signs or letters. Furthermore, it is to be noted that the porcelain socket is in no sense in contact with the metal body of the sign at any point, and therefore all danger of breaking the socket or injuring it in any manner because of the expansion or contraction of the iron body is avoided. Furthermore, the holder for the socket consists of but two pieces coacting to securely clamp the iron body between them and to properly receive the lamp-receiving socket, the whole structure being practically flush with the front of the body 1 and constituting a firm and water-proof joint. It is also to be observed that the labor incident to the assembling and insulation of a part of the sign constructed as hereinbefore described, is reduced to a minimum and the cost of production of the parts which make up the structure is also reduced to a minimum.

What is claimed is:—

1. A means for supporting electric lamp sockets in structures, liable to expansion and contraction under the action of temperature changes, comprising a member introducible between the socket and the main supporting structure, said member being yieldable to the temperature-produced movements of the main structure and thereby relieving the lamp sockets from the strains of such movements.

2. A means for supporting incandescent lamp sockets made of brittle or frangible insulating material in structures liable to expansion and contraction under temperature changes, comprising an intermediate support for each lamp socket interposed between the main structure and the said lamp socket and capable of yielding to the temperature produced movements of the main structure without producing corresponding strains on the lamp socket.

3. A means for supporting porcelain electric lamp sockets in structures liable to expansion and contraction under the action of temperature changes, comprising a metal receptacle for the porcelain socket introducible between the socket and the main supporting structure, said receptacle being composed of a metal softer than the main structure and yieldable to the temperature-produced movements of the main structure so as to thereby relieve the lamp socket from the strains of such movements.

4. A means for attaching frangible electric lamp sockets to metal structures comprising a screw sleeve adapted to extend through the metal supporting structure and to engage one face of the same, and another screw sleeve adapted to screw over the first sleeve and to engage the metal structure on the face thereof remote from that engaged by the first screw sleeve, said sleeves being formed of metal softer and thinner than the metal of the main supporting structure.

5. A means for adapting frangible electric lamp sockets to metal sign bodies, comprising two screw sleeves, one adapted to screw upon the other and both provided with annular radial flanges at the like ends, said sleeves being made of a softer metal than the metal of the body of the sign.

6. An electric sign having a metal body with orifices locating the electric lamps, a screw sleeve adapted to extend through an orifice in the metal body and provided with a flange engaging the corresponding face of the metal about the orifice, another screw sleeve adapted to be screwed upon the first sleeve and provided with an end flange to engage the face of the metal body about the orifice on the side remote from the face engaged by the flange of the first sleeve, and an insulating lamp socket provided with a screw neck adapted to the inner screw sleeve and having a limiting shoulder engaging the corresponding end of the sleeve or sleeves, the length of the neck being such that its outer end is substantially flush with the outer face of the sign body when the shoulder is in engagement with the screw sleeves.

7. As a new article of manufacture, a sign receptacle consisting of an insulating body having lamp receiving terminals and a threaded neck at the lamp-receiving end, in combination with co-acting screw rings arranged to grip the sign body between the same, one of said rings being threaded to receive the neck of said insulating receptacle together with a stop arranged to prevent the protrusion of said neck beyond the face of said sign body, substantially as described.

8. As a new article of manufacture, a sign receptacle consisting of an insulating body having lamp-receiving terminals and a threaded neck at the lamp-receiving end, in combination with coöperating screw rings arranged to grip the sign body between the same, one of said rings being threaded to receive the neck of said insulating receptacle, when inserted from the rear face of the sign body, substantially as described.

In testimony that I claim the foregoing as my own, I have hereto affixed my signature in the presence of two witnesses.

FREDERICK W. RUBY.

Witnesses:
VERNE W. BADGLEY,
MABEL ALLINGTON.